United States Patent
Jussila (10) Patent No.: US 10,274,368 B2
(45) Date of Patent: Apr. 30, 2019

(54) DEFINING SOFTWARE CONFIGURATION FOR HYPERSPECTRAL IMAGING APPARATUS

(71) Applicant: Specim, Spectral Imaging Oy Ltd., Oulu (FI)

(72) Inventor: Jouni Jussila, Oulu (FI)

(73) Assignee: SPECIM, SPECTRAL IMAGING OY LTD., Oulu (FI)

( * ) Notice: Subject to any disclaimer, the term of this patent is extended or adjusted under 35 U.S.C. 154(b) by 0 days.

(21) Appl. No.: 15/815,124

(22) Filed: Nov. 16, 2017

(65) Prior Publication Data
US 2018/0172516 A1 Jun. 21, 2018

(30) Foreign Application Priority Data

Dec. 20, 2016 (EP) .................................... 16205351

(51) Int. Cl.
*G01J 3/28* (2006.01)
*G01J 3/36* (2006.01)
*G06F 8/35* (2018.01)

(52) U.S. Cl.
CPC .............. *G01J 3/2823* (2013.01); *G01J 3/36* (2013.01); *G06F 8/35* (2013.01); *G01J 2003/2826* (2013.01); *G06T 2207/10036* (2013.01)

(58) Field of Classification Search
CPC ........ G01J 3/02; G01J 3/00; G01J 3/28; G01J 3/36; G01J 1/00; G01J 1/58; A61B 5/00; A61B 5/145; A61B 5/1495; G06K 9/00; G06K 9/46; G06K 9/62; G06K 9/66
See application file for complete search history.

(56) References Cited

U.S. PATENT DOCUMENTS

| | | | |
|---|---|---|---|
| 2010/0185067 A1* | 7/2010 | Gupta | A61B 5/0097 600/323 |
| 2011/0099532 A1 | 4/2011 | Coldicott et al. | |
| 2014/0129822 A1 | 5/2014 | Weatherhead et al. | |

FOREIGN PATENT DOCUMENTS

WO 2015188275 A1 12/2015

OTHER PUBLICATIONS

European Search Report for corresponding Application No. EP 16 205 351, dated May 29, 2017, 2 pages.

(Continued)

*Primary Examiner* — Abdullahi Nur
(74) *Attorney, Agent, or Firm* — FisherBroyles, LLP (57) ABSTRACT

A method of defining a software configuration for a hyperspectral imaging apparatus includes: creating a plurality of different functionalities, each based on at least one wavelength range; storing one or more of the created functionalities into a hyperspectral image processing model; generating a hyperspectral application for a specific hardware implementation of the hyperspectral imaging apparatus by configuring the hyperspectral application to utilize one or more of the created functionalities of the hyperspectral image processing model; and setting a selection of wavelengths as a control parameter in the hyperspectral application for controlling the specific hardware implementation of the hyperspectral imaging apparatus during an image capture. The selection of wavelengths is based on the wavelength ranges of the utilized one or more created functionalities.

17 Claims, 4 Drawing Sheets

(56) References Cited

OTHER PUBLICATIONS

Extended European Search Report for corresponding Application No. EP 16 205 351.6, dated Jun. 7, 2017, 5 pages.
Specim Spectral Imaging, "Specim FX 17 Datasheet", http://www.specim.fi/downloads/Specim-FX17-Datasheet.pdf, 2 pages.
Specim Spectral Imaging, "Specim FX 10 Datasheet", http://www.specim.fi/downloads/Specim-FX10-Datasheet-20062016.pdf, 2 pages.
Andreas Hueni, et al., "Structure, Components, and Interfaces of the Airborne Prism Experiment (APEX) Processing and Archiving Facility", IEEE Transactions on Geoscience and Remote Sensing, vol. 47, No. 1, Jan. 2009, pp. 29-43.
Kevin W Eliceiri, et al., "Biological Imaging Software Tools", Nature Methods, vol. 9, No. 7, Jul. 2012, pp. 697-710.
Hannes L Röst, et al., "Openms: A Flexible Open-Source Software Platform for Mass Spectrometry Data Analysis", Nature Methods, vol. 13, No. 9, Sep. 2016, pp. 741-748.
Specim Spectral Imaging, "Specsensor SDK", http://www.specim.fi/downloads/SpecSensorSDK_ver1-2014.pdf, 1 page.

\* cited by examiner

DEFINING SOFTWARE CONFIGURATION FOR HYPERSPECTRAL IMAGING APPARATUS

CROSS-REFERENCE TO RELATED APPLICATION

This application claims benefit to European Application No. 16205351.6, filed Dec. 20, 2016, which is incorporated by reference herein in its entirety.

BACKGROUND

Field

The invention relates to a computer-implemented method for defining a software configuration for a hyperspectral imaging apparatus, a software development system, and a computer-readable storage medium comprising computer program code.

Description of the Related Art

Currently there is no direct and easy possibility to create a data processing and visualization flow for devices used for hyperspectral imaging. In general, the data processing flow requires a detailed way of acquiring the data and setting the imager used for hyperspectral data collection, a way to apply preprocessing, processing and visualization algorithms, and save the data in a correct format. To achieve direct results from the measurements, the data processing has to be programmed case by case directly in software to run with an FPGA or PCU of the processing hardware. Alternatively, the hyperspectral processing can only be used in a single processing hardware at the time.

SUMMARY

The present invention seeks to provide an improved method, system, and computer program code.

According to an aspect of the present invention, there is provided a computer-implemented method for defining a software configuration for a hyperspectral imaging apparatus as specified in claim 1.

According to another aspect of the present invention, there is provided a software development system as specified in claim 16.

According to another aspect of the present invention, there is provided a computer-readable storage medium comprising computer program code as specified in claim 17.

BRIEF DESCRIPTION OF THE DRAWINGS

Example embodiments of the present invention are described below, by way of example only, with reference to the accompanying drawings, in which.

DETAILED DESCRIPTION

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain features/structures that have not been specifically mentioned.

Figure 1:
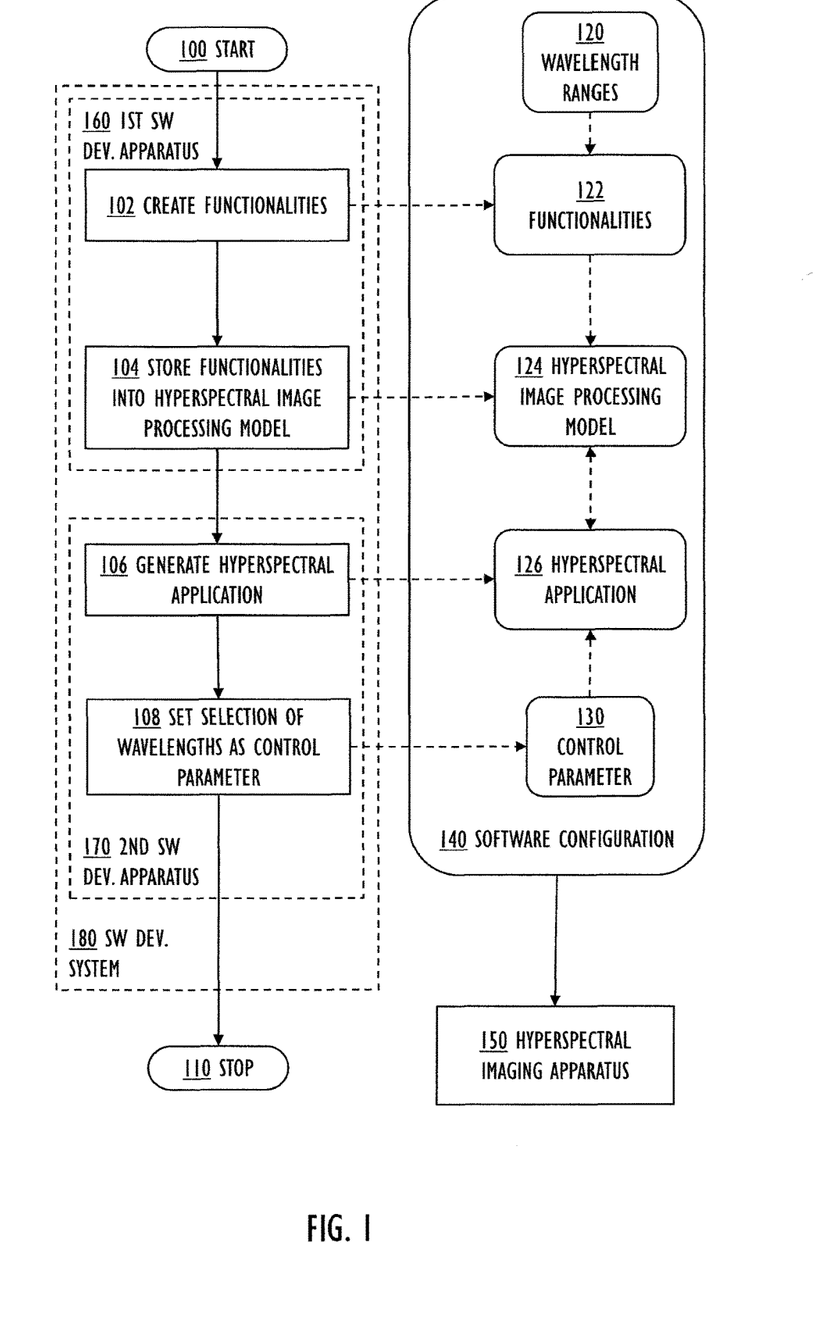
FIGS. 1 and 2 illustrates example embodiments of a method.
Figure 2:
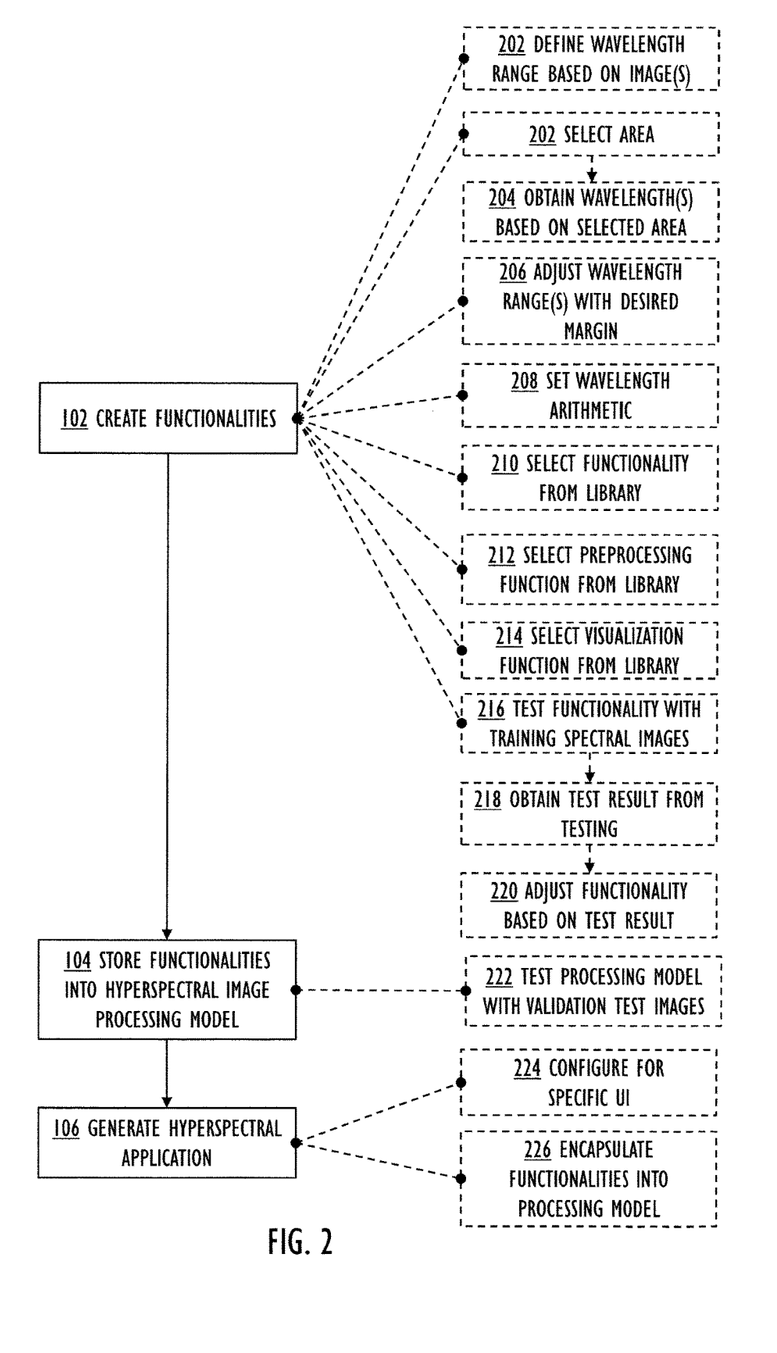

FIGS. 1 and 2 illustrate example embodiments of a computer-implemented method for defining a software configuration 140 for a hyperspectral imaging apparatus 150.

The hyperspectral imaging apparatus 150 collects and processes information from across the electromagnetic spectrum in order to obtain the spectrum for each pixel in a hyperspectral image of a scene, with the purpose of finding objects, identifying materials, or detecting processes, for example. The human eye sees colour of visible light in three bands (red, green, and blue), but the hyperspectral imaging divides the spectrum into many more bands (even beyond the visible bands), such as 380-800 nm, 400-1000 nm, 900-1700 nm, 1000-2500 nm, 3-5 µm, and 8-12.4 µm. The Applicant, Specim, Spectral Imaging Ltd., develops hyperspectral imaging apparatuses 150 in which the described example embodiments may be implemented. The hyperspectral imaging apparatuses 150 are used for various applications such as medical, farming, defence, environment, colour, forestry, geology, water, vegetation research, and forensics.

In FIGS. 1 and 2, the operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or a part of the operation. It should be noted that no special order of operations is required, except where necessary due to the logical requirements for the processing order.

The method starts in 100.

A plurality of different functionalities 122, each based on at least one wavelength range 120, is created in 102.

One or more of the created functionalities 122 is stored into a hyperspectral image processing model 124 in 104.

A hyperspectral application 126 for a specific hardware implementation of the hyperspectral imaging apparatus 150 is generated in 106 by configuring the hyperspectral application 126 to utilize one or more of the created functionalities 122 of the hyperspectral image processing model 124.

A selection 128 of wavelengths is set in 108 as a control parameter 130 in the hyperspectral application 126 for controlling the specific hardware implementation of the hyperspectral imaging apparatus 150 during an image capture, wherein the selection 128 of the wavelengths is based the wavelength ranges 120 of the utilized one or more of the created functionalities 122. In this way, the hyperspectral imaging apparatus 150 needs only capture those wavelengths 120 that belong to the utilized one or more of the created functionalities 102.

The method ends in 110 after the processing is finished, or, it may be looped back to 102 to start again the whole development cycle or back to 106 to generate another application.

Figure 3:
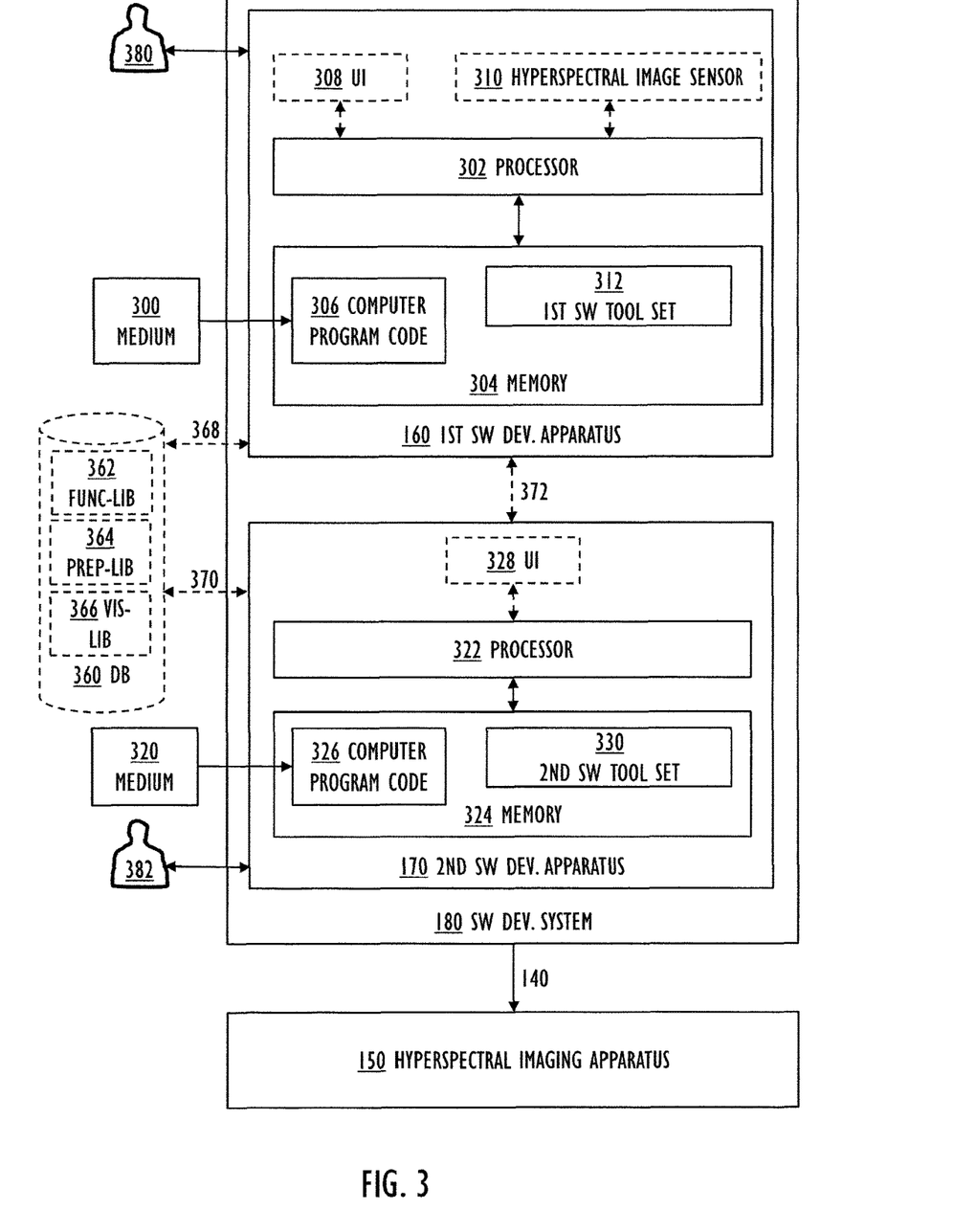
FIG. 3 illustrates example embodiments of a software development system.

In an example embodiment illustrated in FIG. 3, a software development system 180 comprising one or more processors 302, 322, and one or more memories 304, 324 including a computer program code 306, 326 is provided. The one or more memories 304, 324 and the computer program code 306, 326 are configured to, with the one or more processors 302, 322, cause the software development system 180 to perform the described computer-implemented method for defining the software configuration 140 for the hyperspectral imaging apparatus 150.

The example embodiments of the software development system 180 may be utilized to enhance the method with various further example embodiments. For example, various structural and/or operational details may supplement the method.

In an example embodiment, the creating 102 and storing 104 of the hyperspectral image processing model 124 are performed with a first software development apparatus 160, and the generating 106 and setting 108 of the hyperspectral application 126 are performed with a second software development apparatus 170 to define the software configuration 140 for the specific hardware implementation of the hyperspectral imaging apparatus 150.

Communication 372 between the first software development apparatus 160 and the second software development apparatus 170 may be implemented with wired and/or wireless communication technologies. Additionally, or instead of, the communication 368, 370 may also be performed through a common database 360.

The term 'processor' 302, 322 refers to a device that is capable of processing data. Depending on the processing power needed, the software development system 180 (the first software development apparatus 160 and the second software development apparatus 170, for example) may comprise several processors 302, 322 such as parallel processors or a multicore processor. When designing the implementation of the processor 302, 322 a person skilled in the art will consider the requirements set for the size and power consumption of the system 180, the necessary processing capacity, production costs, and production volumes, for example.

The term 'memory' 304, 324 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The processor 302, 322 and the memory 304, 324 may be implemented by an electronic circuitry. A non-exhaustive list of implementation techniques for the processor 302, 322 and the memory 304, 324 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 306, 326 may be implemented by software and/or hardware. In an example embodiment, the software may be written by a suitable programming language (a high-level programming language, such as C, C++, or Java, or a low-level programming language, such as a machine language, or an assembler, for example), and the resulting executable code 306, 326 may be stored on the memory 304, 324 and run by the processor 302, 322. In an alternative example embodiment, the functionality of the hardware may be designed by a suitable hardware description language (such as Verilog or VHDL), and transformed into a gate-level netlist (describing standard cells and the electrical connections between them), and after further phases the chip implementing the processor 302, 322, memory 304, 324 and the code 306, 326 of may be fabricated with photo masks describing the circuitry.

In an example embodiment, both apparatuses 160, 170 comprise a user interface 308, 328 implementing the exchange of graphical, textual and/or auditory information with a user 380, 382. The user interface 308, 328 may be used to perform required user actions in relation to the method for defining the software configuration. The user interface 308, 328 may be realized with various techniques, such as a (multi-touch) display, means for producing sound, a keyboard, and/or a keypad, for example. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, or alternatively, the user interface may comprise other user interface components, for example various means for focusing a cursor (mouse, track ball, arrow keys, touch sensitive area etc.) or elements enabling audio control.

In an example embodiment, a computer-readable storage medium 300, 320 comprising computer program code 306, 326 is provided, and which, when loaded into a software development system 180 and executed by the software development system 180, causes the software development system 180 to perform the computer-implemented method for defining the software configuration 140 for the hyperspectral imaging apparatus 150.

In an example embodiment, the operations of the computer program code 306, 326 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 306, 326 for performing a wide variety of standard operations. In an example embodiment, the computer program code 306, 326 may be in source code form, object code form, executable file, or in some intermediate form. The computer-readable medium 300, 320 may comprise at least the following: any entity or device capable of carrying the computer program code 306, 326 to the system 180, a record medium, a computer memory, a read-only memory, an electrical carrier signal, a telecommunications signal, and a software distribution medium. In some jurisdictions, depending on the legislation and the patent practice, the computer-readable medium 300, 320 may not be the telecommunications signal. In an example embodiment, the computer-readable medium 300, 320 may be a non-transitory computer-readable storage medium.

Figure 4:
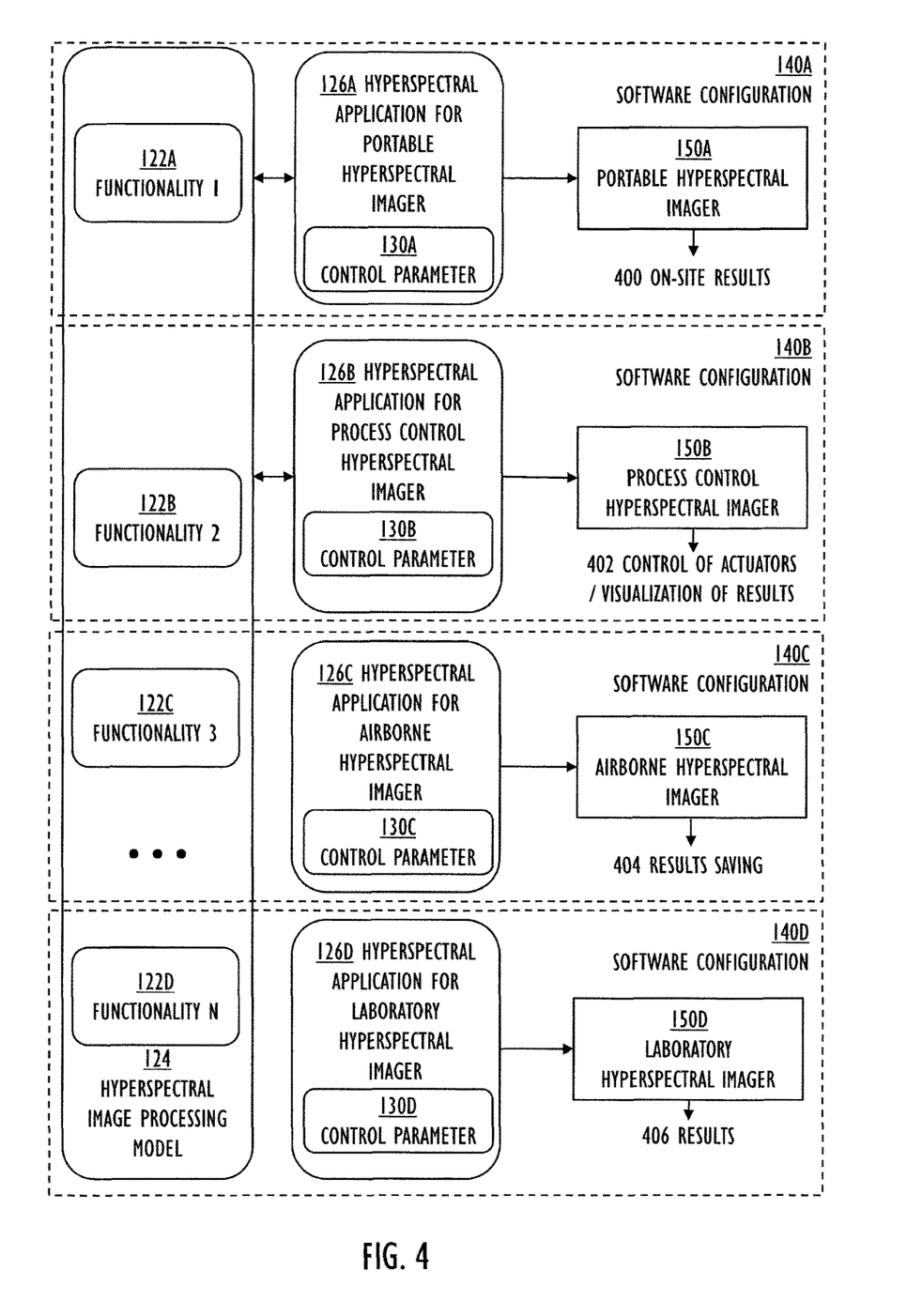
FIG. 4 illustrates example embodiments of hyperspectral imaging apparatuses and their software configurations.

FIG. 4 illustrates example embodiments of hyperspectral imaging apparatuses 150A, 150B, 150C and their software configurations 140A, 140B, 140C. In an example embodiment, the specific hardware implementation of the hyperspectral imaging apparatus 150 comprises at least one of the following: a portable hyperspectral imager 150A, a process control hyperspectral imager 150B, an airborne hyperspectral imager 150C, a laboratory hyperspectral imager 150D.

As illustrated in FIG. 4, a plurality of functionalities (N=any integer greater than two) 122A, 122B, 122C, 122D belong to the hyperspectral image processing model 124.

Each specific hardware implementation of the hyperspectral imaging apparatus 150A, 150B, 150C, 150D becomes own software configuration 140A, 140B, 140C, 150D comprising a specific application 126, such as a hyperspectral application 126A for a portable hyperspectral imager 150A comprising the control parameter 130A, a hyperspectral application 126B for a process control hyperspectral imager 150B comprising the control parameter 130B, a hyperspectral application 126C for an airborne hyperspectral imager 150C comprising the control parameter 130C, and a hyperspectral application 126D for a laboratory hyperspectral imager 150D comprising the control parameter 130D. As shown in FIG. 4, the hyperspectral imager 150A only needs to process the wavelength range 120 of the functionality 122A during an image capture, the hyperspectral imager 150B only the wavelength range 120 of the functionality 122B, the hyperspectral imager 150C only the wavelength range 120 of the functionality 122C, and the hyperspectral imager 150D only the wavelength range 120 of the functionality 122D, In this way, the hyperspectral image capture becomes easier and/or faster and/or saves resources (memory, processing power, electric power), as only a subset of all possible wavelength ranges needs to be processed.

FIG. 4 describes a modular structure for creating the hyperspectral application 126A, 126B, 126C, 126D. The processing model 124 defines how to process the data. The application 126A, 126B, 126C, 126D handles hardware 150A, 150B, 150C, 150D to collect data, feeds the data to the processing model 124, and handles the results based on the settings.

In an example embodiment, the application 126A, 126B, 126C, 126D contains settings and adjustment for the dedicated hardware, functionalities to use the selected processing model 124 for data processing, and handling the results. The application 126A, 126B, 126C, 126D may perform one or more of the following: a selection of processing model 124, hardware settings for used hyperspectral imaging sensor, data saving settings, data visualization settings, data sharing settings. The processing model 124 may contain functionalities that are needed to process hyperspectral imaging data (spectral and image data) to extract and visualize the targeted information in the needed format. Functions include for example: a wavelength range selection, preprocessing functions, reference spectrum handling, creating classes, setting and adjusting classification, setting wavelength arithmetic, spatial image analysis, result visualization methods.

FIG. 4 illustrates using the same data processing model 124 to create applications 126A, 126B, 126C, 126D for hyperspectral systems operating in different environments. The data processing model 124 is general and the application 126A, 126B, 126C, 126D packages the functionalities to use the extracted results in the way needed in the application environment.

In this way, different kinds of hyperspectral imagers 150A, 150B, 150C, 150D have their own application 126A, 126B, 126C, 126D, but still are able to use a general processing model 124, although the processing model 124, may, naturally, also be configured for each specific use (by leaving out unneeded functionalities 122, for example). The portable hyperspectral imager 150A may provide on-site results 400 for a user, for example. The process control hyperspectral imager 150B may control 402 actuators through an industrial bus, and/or visualize 402 results for a process control, for example. The airborne hyperspectral imager 150C may provide results sharing 404 through a radio link, for example. The laboratory hyperspectral imager 150D may provide results 406, for example Naturally, the hyperspectral imagers 150 for other applications may also utilize the described method for defining the software configuration 140.

In an example embodiment, the creating 102 and storing 104 are performed with a first software tool set 312 for building the hyperspectral image processing model 124, and the generating 106 and setting 108 are performed with a second software tool set 330 for building the hyperspectral application 126.

The defined processing 102-104-106-108 separates the information extraction and hardware related functionalities and introduces a modular way of creating the hyperspectral imaging application 126. This way, the information extraction from the hyperspectral imaging data may be planned and designed separately in 102 and 104, and used as a component 124 to define how the data processing is done with the used hyperspectral imaging hardware 150.

The problem of the prior art solution is that applying and modifying calculations for different applications or devices is a slow and difficult process. Each used environment is different and the same data processing methods cannot easily be used in different environments. This difficulty is limiting the usage of hyperspectral imaging technology.

The described example embodiments make adjusting of hyperspectral imaging devices 150 for different applications as easy as possible, and separate scientific data processing flow and hardware specific functions from each other, even to different development apparatuses 160, 170 and/or to different tool sets 312, 330. This way, the same data processing flow is applicable for different hardware. The new approach will ease creating the hyperspectral imaging applications and transferring them between environments, from a laboratory to a production line, for example.

The described example embodiments split the application building into a modular structure. First, the algorithms and functionalities needed for information extraction from hyperspectral imaging data are included into separate functionalities 122. Next, a processing pipeline is constructed from these functions. The processing pipeline is described as the hyperspectral image processing model 124, and it only relates to the details that has to be done for the hyperspectral imaging information to extract information important and related to the target application. The hyperspectral image processing model 124 does not have any hardware related details included; it only takes care of the hyperspectral processing.

After this, the processing package is packaged into the hyperspectral application 126. The hyperspectral application 126 describes how the selected processing model 124 is applied to the used hardware 150, and how the hardware 150 is used. The hyperspectral application 126 describes how the data is collected with the hardware 150 for which the hyperspectral application 126 is planned for, then what is fed into hyperspectral image processing model 124, and after the information extraction it describes how the results generated with the hyperspectral image processing model 124 will be saved and/or shared.

According to the prior art, an application including both hyperspectral processing and hardware related functionalities in a single package is created. However, such full package must be modified, if the hardware used is changed. In addition, including everything in the single package requires the same integrated software tool to be used by both for the information extraction definition as well as for the hardware-dedicated adjustments. Separating the information extraction and hardware settings in different modules according to the described example embodiments allows also different specialists 380, 382 to collaborate. Regardless of the hardware needed, a chemometry specialist 380 may work on the data processing, i.e. information extraction problems solving and package that into a (sellable or shareable) module 122/124. On the other hand, a hardware specialist 382 may benefit from the data processing module 122/124 and integrate it to the hardware used, without a need for understanding the data processing details defined in the functionalities 122 or hyperspectral image processing module 124.

Sharing the solution into the modules 122, 124 enables a creation of a web shop type of a community or user environment for the hyperspectral imaging community. This will enable further commercialization of the technology, both related to hardware but especially for the data processing. Both the full solutions as well as separated data processing modules may be shared and/or sold.

In an example embodiment, the hyperspectral application 126 is configured in 224 for a specific user interface implementation of the specific hardware implementation of the hyperspectral imaging apparatus 150.

In an example embodiment, the at least one wavelength range 120 is defined in 202 based on at least one hyperspectral image. In an example embodiment, an apparatus 160, such as a portable hyperspectral imager 150A, comprises a hyperspectral image sensor 310 for generating the hyperspectral image.

In an example embodiment, an area in a hyperspectral image is selected in 202, and the at least one wavelength range 120 is obtained in 204 based on the selected area. The selection may be made with suitable tools used for image manipulation.

In an example embodiment, at least one predefined functionality for the hyperspectral image processing model 124 is selected in 210 from a library 362 comprising a plurality of predefined functionalities. The library 362 may include a collection of read-made functionalities and/or user-generated functionalities offered for use by others.

In an example embodiment, at least one preprocessing function for the created functionality is selected in 212 from a library 364 comprising a plurality of predefined preprocessing functions. The library 364 of preprocessing may include standard manipulation or information, such as a specific wavelength range 120 for a specific plant disease, for example.

In an example embodiment, the at least one wavelength range 120 of the created functionality 122 is adjusted in 206 with a desired margin. The desired margin may be obtained with a suitable formula, or the user 380 may adjust the margin based on his/her experience, for example.

In an example embodiment, a wavelength arithmetic of the created functionality 122 is set in 208. The wavelength arithmetic may define a formula with which to analyze hyperspectral image data, for example.

In an example embodiment, at least one visualization function for the created functionality 122 is selected in 214 from a library 366 comprising a plurality of predefined visualization functions. The visualization function may define a certain colour or pattern with which an interesting area in the hyperspectral image may be displayed: parts of a plant infected with a plant disease may be shown with a specific colour in the hyperspectral image, for example.

In an example embodiment, the created functionality 122 is tested in 216 with a plurality of training hyperspectral images. The training hyperspectral images may be from a standard reference library, and/or taken by the user 380, for example. The training hyperspectral images may illustrate various plant diseases, for example, and each functionality 122 detects a specific plant disease.

In an example embodiment, a test result is obtained in 218 from the testing, and the created functionality 122 is adjusted in 220 based on the test result. The test result may include a detection/non-detection of one or more plant diseases, for example.

In an example embodiment, the hyperspectral image processing model 124 is tested in 222 with a plurality of validation test images. The validation test images may be from a standard reference library, and/or taken by the user 380.

In an example embodiment, the selected one or more of the created functionalities 122 is encapsulated in 226 into the hyperspectral image processing model 124. The encapsulation may be used to hide details of the internal processing of the functionalities 122, 122A, 122B, 122C, 122D. This supports the separation of the processing related to the processing model 124 and the applications 126A, 126B, 126C, thus enabling their separate development, with different apparatuses 160, 170, and/or with different software tool sets 312, 330 as was explained earlier.

It will be obvious to a person skilled in the art that, as technology advances, the inventive concept can be implemented in various ways. The invention and its embodiments are not limited to the example embodiments described above but may vary within the scope of the claims.

What is claimed is:

1. A computer-implemented method for defining a software configuration for a hyperspectral imaging apparatus, the method comprising:
   creating a plurality of different functionalities, each based on at least one wavelength range;
   storing one or more of the created functionalities into a hyperspectral image processing model;
   generating a hyperspectral application for a specific hardware implementation of the hyperspectral imaging apparatus by configuring the hyperspectral application to utilize one or more of the created functionalities of the hyperspectral image processing model; and
   setting a selection of wavelengths as a control parameter in the hyperspectral application for controlling the specific hardware implementation of the hyperspectral imaging apparatus during an image capture, wherein the selection of the wavelengths is based the wavelength ranges of the utilized one or more of the created functionalities.

2. The method of claim 1, further comprising:
   configuring the hyperspectral application for a specific user interface implementation of the specific hardware implementation of the hyperspectral imaging apparatus.

3. The method of claim 1, further comprising:
   defining the at least one wavelength range based on at least one hyperspectral image.

4. The method of claim 1, further comprising:
   selecting an area in a hyperspectral image; and
   obtaining the at least one wavelength range based on the selected area.

5. The method of claim 1, further comprising:
   selecting at least one predefined functionality for the hyperspectral image processing model from a library comprising a plurality of predefined functionalities.

6. The method of claim 1, further comprising:
selecting at least one preprocessing function for the created functionality from a library comprising a plurality of predefined preprocessing functions.

7. The method of claim 1, further comprising:
adjusting the at least one wavelength range of the created functionality with a desired margin.

8. The method of claim 1, further comprising:
setting a wavelength arithmetic of the created functionality.

9. The method of claim 1, further comprising:
selecting at least one visualization function for the created functionality from a library comprising a plurality of predefined visualization functions.

10. The method of claim 1, further comprising:
testing the created functionality with a plurality of training hyperspectral images.

11. The method of claim 10, further comprising:
obtaining a test result from the testing; and
adjusting the created functionality based on the test result.

12. The method of claim 1, further comprising:
testing the hyperspectral image processing model with a plurality of validation test images.

13. The method of claim 1, further comprising:
encapsulating the selected one or more of the created functionalities into the hyperspectral image processing model.

14. The method of claim 1, further comprising:
performing the creating and storing with a first software tool set for building the hyperspectral image processing model; and
performing the generating and setting with a second software tool set for building the hyperspectral application.

15. The method of claim 1, further comprising:
performing the creating and storing of the hyperspectral image processing model with a first software development apparatus; and
performing the generating and setting of the hyperspectral application with a second software development apparatus to define the software configuration for the specific hardware implementation of the hyperspectral imaging apparatus, the specific hardware implementation of the hyperspectral imaging apparatus comprising at least one of the following: a portable hyperspectral imager, a process control hyperspectral imager, an airborne hyperspectral imager, a laboratory hyperspectral image.

16. A software development system comprising one or more processors, and one or more memories including a computer program code, the one or more memories and the computer program code being configured to, with the one or more processors, cause the software development system to perform a computer-implemented method for defining a software configuration for a hyperspectral imaging apparatus, the method comprising:
creating a plurality of different functionalities, each based on at least one wavelength range;
storing one or more of the created functionalities into a hyperspectral image processing model;
generating a hyperspectral application for a specific hardware implementation of the hyperspectral imaging apparatus by configuring the hyperspectral application to utilize one or more of the created functionalities of the hyperspectral image processing model; and
setting a selection of wavelengths as a control parameter in the hyperspectral application for controlling the specific hardware implementation of the hyperspectral imaging apparatus during an image capture, wherein the selection of the wavelengths is based the wavelength ranges of the utilized one or more of the created functionalities.

17. A non-transitory computer-readable storage medium comprising computer program code that when executed by a software development system, causes the software development system to perform a computer-implemented method for defining a software configuration for a hyperspectral imaging apparatus, the method comprising:
creating a plurality of different functionalities, each based on at least one wavelength range;
storing one or more of the created functionalities into a hyperspectral image processing model;
generating a hyperspectral application for a specific hardware implementation of the hyperspectral imaging apparatus by configuring the hyperspectral application to utilize one or more of the created functionalities of the hyperspectral image processing model; and
setting a selection of wavelengths as a control parameter in the hyperspectral application for controlling the specific hardware implementation of the hyperspectral imaging apparatus during an image capture, wherein the selection of the wavelengths is based the wavelength ranges of the utilized one or more of the created functionalities.

\* \* \* \* \*